United States Patent
Rabb

(10) Patent No.: US 8,456,702 B2
(45) Date of Patent: Jun. 4, 2013

(54) SYSTEM AND METHOD FOR USING A MULTI-FUNCTION PRINTER AS A USER INTERFACE FOR A PRINT DRIVER

(75) Inventor: Khalid Rabb, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 485 days.

(21) Appl. No.: 12/715,620

(22) Filed: Mar. 2, 2010

(65) Prior Publication Data

US 2011/0216333 A1 Sep. 8, 2011

(51) Int. Cl.
*H04N 1/387* (2006.01)
*G06K 15/02* (2006.01)
*G06F 3/12* (2006.01)

(52) U.S. Cl.
CPC ............ *G06F 3/1201* (2013.01); *G06F 3/1242* (2013.01); *G06F 3/125* (2013.01); *G06F 3/1253* (2013.01)
USPC .......... 358/1.9; 358/1.13; 358/1.18; 715/255; 715/274

(58) Field of Classification Search
USPC .............. 358/1.2, 1.9, 2.1, 1.13, 1.15–1.18, 358/3.24, 501, 518, 521, 527, 537, 538, 448–462; 715/200, 204, 234, 243, 255, 273–276, 700, 748, 760
See application file for complete search history.

(56) References Cited

U.S. PATENT DOCUMENTS

| | | | |
|---|---|---|---|
| 5,606,395 A | 2/1997 | Yang et al. | |
| 5,978,560 A | 11/1999 | Tan et al. | |
| 6,203,220 B1 | 3/2001 | Takenoshita et al. | |
| 6,335,795 B1 | 1/2002 | Neuhard et al. | |
| 6,369,909 B1* | 4/2002 | Shima | 358/1.15 |
| 6,515,756 B1 | 2/2003 | Mastie et al. | |
| 6,940,615 B1* | 9/2005 | Shima | 358/1.15 |
| 7,034,954 B1* | 4/2006 | Utsunomiya | 358/1.16 |
| 7,054,022 B2 | 5/2006 | Kazama et al. | |
| 7,239,409 B2* | 7/2007 | Parry | 358/1.15 |
| 7,249,900 B1* | 7/2007 | Katano et al. | 358/1.15 |
| 7,280,242 B2 | 10/2007 | Hobbs | |
| 7,826,103 B2* | 11/2010 | Kayama | 358/1.13 |
| 2006/0050307 A1* | 3/2006 | Koike | 358/1.15 |
| 2010/0027054 A1* | 2/2010 | Reddy et al. | 358/1.15 |
| 2010/0039662 A1* | 2/2010 | Reddy et al. | 358/1.15 |

* cited by examiner

*Primary Examiner* — Scott A Rogers
(74) *Attorney, Agent, or Firm* — Fay Sharpe LLP

(57) ABSTRACT

A multi-function printer including a processor and a computer-readable storage medium in communication with the processor, wherein the computer-readable storage medium comprises one or more programming instructions for: receiving a plurality of electronic documents from one or more electronic devices; storing the plurality of electronic documents in a storage unit located within the multi-function printer; permitting access to one or more of the plurality of electronic documents via a user interface positioned about the multi-function printer; permitting selection of one or more print attributes via the user interface; applying the one or more print attributes selected to the one or more electronic documents accessed and outputting the one or electronic documents accessed having the one or more print attributes applied thereto.

20 Claims, 3 Drawing Sheets

SYSTEM AND METHOD FOR USING A MULTI-FUNCTION PRINTER AS A USER INTERFACE FOR A PRINT DRIVER

BACKGROUND

1. Field of Related Art

The present disclosure is generally related to multi-function printers, and more particularly, to a system and method for using a multi-function printer as a user interface for a print driver.

2. Description of Related Art

Image forming devices such as printers, copiers, and multi-function devices provide users the ability to print from a device such as a desktop or laptop computer, a handheld computer, or other electronic devices, to a printer connected to the device. The electronic devices may be stand alone devices, or may be connected in a network, such as in a business computing environment, which may include one or more printers.

In order for a printer to interface and function with the computer to which it is connected, a printer driver may typically be installed on the computer. A printer driver is software which controls the printer from the computer. The printer driver may include a user interface which may be typically accessed by a user through an operating system or an application program, such as a word processing program, a spreadsheet program, or other types of programs, and viewed on a display.

When a user is getting ready to print a document, the print driver provides the user with a plurality of desired print attributes. The user may decide to print the document with a different paper size. A user may also wish to make other changes to the document to be printed, such as scaling of the printed image, changing orientation of the printed image, changing a position of the image on the page, or printing certain pages in color. However, all these print attributes are only available via a print driver installed on a personal computer. It would be useful if the printer driver was not limited to being installed on only a personal computer.

SUMMARY

A multi-function printer is presented including a processor and a computer-readable storage medium in communication with the processor, wherein the computer-readable storage medium comprises one or more programming instructions for: receiving a plurality of electronic documents from one or more electronic devices; storing the plurality of electronic documents in a storage unit located within the multi-function printer; permitting access to one or more of the plurality of electronic documents via a user interface positioned about the multi-function printer; permitting selection of one or more print attributes via the user interface; applying the one or more print attributes selected to the one or more electronic documents accessed and outputting the one or electronic documents accessed having the one or more print attributes applied thereto.

A method is presented for using a multi-function printer having a print driver, including receiving a plurality of electronic documents from one or more electronic devices; storing the plurality of electronic documents in a storage unit located within the multi-function printer; permitting access to one or more of the plurality of electronic documents via a user interface positioned about the multi-function printer; permitting selection of one or more print attributes via the user interface; applying the one or more print attributes selected to the one or more electronic documents accessed; and outputting the one or electronic documents accessed having the one or more print attributes applied thereto.

A multi-function printer is presented including one or more input modules for receiving information from one or more host devices; a memory for storing the information received from the one or more host devices; a processor for executing a plurality of instructions related to the information received from the one or more host devices; a user interface for accessing the information and for altering the information based on a plurality of print attributes; and an outputting module for printing the information altered based on the plurality of print attributes.

BRIEF DESCRIPTION OF THE DRAWINGS

These and other advantages will become more apparent from the following detailed description of the various embodiments of the present disclosure with reference to the drawings wherein.

DETAILED DESCRIPTION

Figure 1:
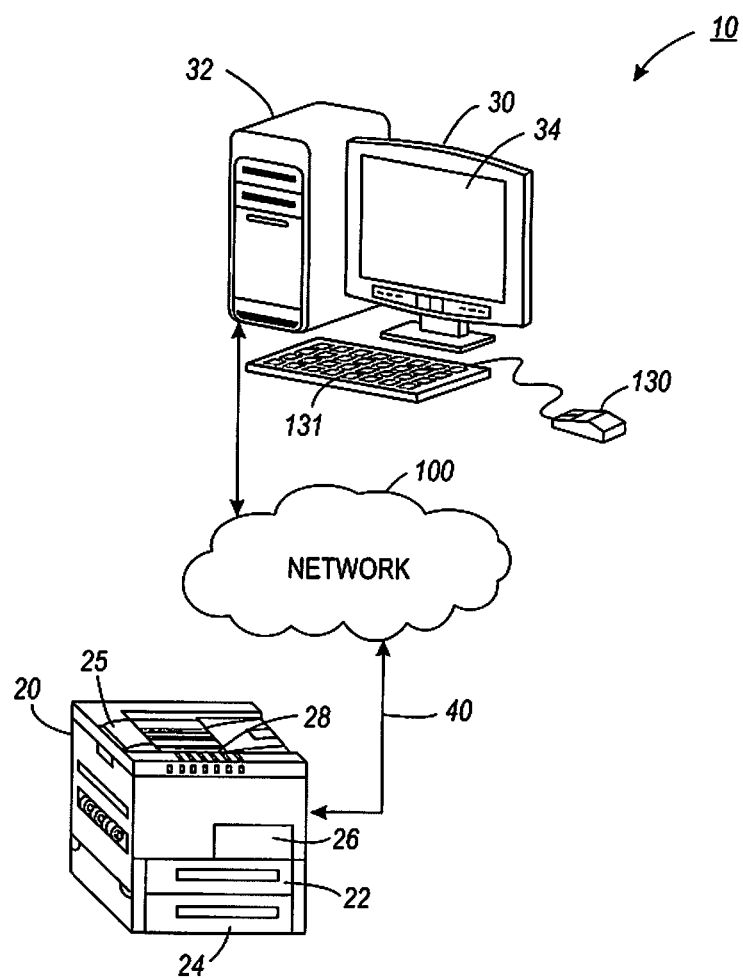
FIG. 1 illustrates a system diagram including a multi-function printer in electrical communication with a host device connected via a network, in accordance with the present disclosure.

Particular embodiments of the present disclosure are described herein below with reference to the accompanying drawings. In the following description, well-known functions or constructions are not described in detail to avoid obscuring the present disclosure in unnecessary detail.

The exemplary embodiments of the present disclosure propose a multi-function printer that allows a user to access original documents (e.g., Word®, PowerPoint®, Excel®, etc.) in their creative format (vs. Print Ready Format), and apply all types of printing attributes (e.g., plex, color, quantity, stapling, paper size, margins, watermark etc, etc.) right at the user interface (UI) of the multi-function printer. In this way, a user may access any document in a repository (e.g., file folder, email, etc), or removable media, and interact with a screen at the multi-function device that allows the user to select print job attributes, and have those attributes applied to the document.

The exemplary embodiments of the present disclosure further propose a method where a user walks up to a multi-function printer, the user accesses an EIP (extensible interface platform) style application for printing documents, the application invokes a set of screens that are to be linked to the server application, the user manipulates these screens to select a document, and the user then continues with the screens and selects one or more print attributes (e.g., Plex, Color, Paper, Margins, Page numbering, Quantity, etc.). Once the selections are performed by the user, the user selects the print button to print the documents having the one or more print attributes. The EIP style application takes the original document, and through a variety of possible methods converts the document into a print ready format. The document is now printed exactly as the user specified at the time that the user approached the multi-function device.

Prior to describing the present disclosure in further detail, it will first be helpful to define various terms that will be used throughout the following discussion. For example:

The term "print" is overloaded to mean sending the document to the printer through any one of a multitude of ways. Moreover, the term "printer" may refer to any device that accepts text and graphic output from any type of computing device and transfers the information to any printable medium. A "printer" may refer to any type of xerographic, solid ink, liquid ink, cut sheet or web-based device used to print onto a wide array of printable media. The term "printer" as used herein encompasses any apparatus, such as a digital copier, bookmaking machine, facsimile machine, multi-function machine, etc. which performs a print outputting function for any purpose.

The term "storage" may refer to data storage. "Data storage" may refer to any article or material (e.g., a hard disk) from which information is capable of being reproduced, with or without the aid of any other article or device. "Data storage" may refer to the holding of data in an electromagnetic form for access by a computer processor. Primary storage is data in random access memory (RAM) and other "built-in" devices. Secondary storage is data on hard disk, tapes, and other external devices. "Data storage" may also refer to the permanent holding place for digital data, until purposely erased. "Storage" implies a repository that retains its content without power. "Storage" mostly means magnetic disks, magnetic tapes and optical discs (CD, DVD, etc.). "Storage" may also refer to non-volatile memory chips such as flash, Read-Only memory (ROM) and/or Electrically Erasable Programmable Read-Only Memory (EEPROM).

The term "application" in the disclosed embodiments refers to a program designed for end users of a computing device, such as a word processing program, a database program, a browser program, a spreadsheet program, a gaming program, and the like. An application is distinct from systems programs, which consist of low-level programs that interact with the computing device at a very basic level, such as an operating system program, a compiler program, a debugger program, programs for managing computer resources, and the like.

A printer "document setting" in the disclosed embodiments refers to a setting of an attribute of a document to be printed that may be selected and saved by the user. Examples of printer document settings are settings for stapled or not stapled, paper size, watermark, paper tray, print resolution, and color printing or black and white printing. A printer "default setting" in the disclosed embodiments refers to one or more document settings that are saved as a default setting to be automatically used for printing unless manually changed at the time of printing. A printer "document default setting" in the disclosed embodiments refers to one or more document settings that are saved to be automatically used for printing the particular document unless the settings are manually changed at the time of printing.

The term "module" may refer to a self-contained component (unit or item) that is used in combination with other components and/or a separate and distinct unit of hardware or software that may be used as a component in a system, such as a printing system including a plurality of multi-function printers and/or multi-function devices (MFDs). The term "module" may also refer to a self-contained assembly of electronic components and circuitry, such as a stage in a computer that is installed as a unit.

The term "electronic device" may refer to one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics may apply in any type of entertainment, communications, home, and/or office capacity. Thus, the term "electronic device" may refer to any type of electronics suitable for use with a circuit board and intended to be used by a plurality of individuals for a variety of purposes.

Embodiments will be described below while referencing the accompanying figures. The accompanying figures are merely examples and are not intended to limit the scope of the present disclosure.

Referring to FIG. 1 a system diagram including a multi-function printer in electrical communication with a host device connected via a network, in accordance with the present disclosure is presented.

The system 10 includes a printer 20 and a host device 30. Printer 20 includes trays 22 and 24 for holding media and monitor 26 for monitoring the status of the media in each of trays 22 and 24. Monitor 26 may include sensors for detecting the level of media in each tray, sensors for detecting when a tray is empty, and sensors for detecting the type of media in each tray. Alternatively, printer 20 may be configured such that the user may specify, though a panel menu 28 the type and size of media in each tray. Printer 20 also may include a user interface 25 which displays a plurality of screens for accessing documents and applying print attributes to the documents. For instance, when a user wishes to access a document at printer 20, the user accesses the user interface 25 to retrieve the document. The user may then select one or more print attributes from a plurality of screens to apply to the document. Once all the desired print attributes are applied to the document, the user may print the document having the applied print attributes directly to the document and then sent to the printer 20. It is noted that printer 20 may be a multi-function printer or any type of multi-function device (MFD).

Host device 30, which may be a personal computer, may optionally include a display 34. Host device 30 and printer 20 are shown as connected to a network 100. However, they may be directly connected to each other, such as if printer 20 were directly connected to a parallel port or USB (universal serial bus) port of host device 30. The EIP application is installed on this computer. In other instantiations the application could be installed on the printer 20.

Printer driver 32 may be installed on host device 30 and may reside on the host device's hard drive. Printer driver 32 may include a controller for controlling operation of the printer from the host device 30, a query routine for querying the printer 20 for consumable status information.

Additionally, a printer driver may be installed directly in the printer 20. The printer driver located within printer 20 may include a query routine which may be configured to query different aspects of the printer 20. Indeed, whatever information is available about printer 20 may be queried and displayed in the printer driver user interface 25. For example, many printers provide the following information: installable options, tray count, media type (for each tray), media size (for each tray), status (for each tray) and name (for each tray). Additionally, if the printer 20 is configured to monitor ink or toner consumables (for each container, for example, color, quantity or level, name) that information may be queried and displayed in the printer driver user interface.

If the printer 20 is directly connected to host device 30, the user interface 25 may obtain this information from the printer 20 by querying the printer 20 through the parallel port or USB port. If the printer 20 is located on a network, the user interface 25 may query the printer 20 by simply having an IP address of the printer 20 to query the information via socket communications.

Moreover, the printer 20 may include a memory (not shown), a processor (not shown), input/output devices (not shown), and a bus 40. The bus 40 may permit communication and transfer of signals among the printer 20 and the network 100.

The processor may include at least one conventional processor or microprocessor that interprets and executes instructions. The processor may be a general purpose processor or a special purpose integrated circuit, such as an ASIC (application-specific integrated circuit), and may include more than one processor sections. Additionally, the printer 20 may include a plurality of processors.

The memory may be a random access memory (RAM) or another type of dynamic storage device that stores information and instructions for execution by processor. The memory may also include a read-only memory (ROM) which may include a conventional ROM device or another type of static storage device that stores static information and instructions for the processor located within the printer 20. The memory may be any memory device that stores data for use by system 10.

Additionally, printer 20 may include input/output devices (I/O devices) that may include one or more conventional input mechanisms that permit a user to input information to the system 10, such as a microphone, touchpad, keypad, keyboard, mouse, pen, stylus, voice recognition device, buttons, etc., and output mechanisms such as one or more conventional mechanisms that output information to the user, including a display, one or more speakers, a storage medium, such as a memory, magnetic or optical disk, disk drive, a printer device, etc., and/or interfaces for the above.

Referring back to the query routine, the query routine may be configured to query the printer 20 when the user first opens the user interface 25. This provides the user with instantaneous status information. The query routine may be configured to query the printer 20 in accordance with a predetermined period schedule. Whatever information is received in response to the query routine, may be provided to the user interface 25. This provides the user with dynamic updates directly at the printer 20. The query routine may be configured to query the printer 20 in response to a user input. The query routine may be configured such that updating occurs with minimal user interruption.

The user interface 25 allows the user of the printer 20 to select one or more print attributes to apply to the one or more documents selected. The one or more print attributes may include at least one or more of the following: plex, color, quantity, stapling, paper size, margins, watermark etc, etc. The user may apply these print attributes directly from the printer 20 to the documents stored on the printer 20. Thus, the user does not need to re-access a host device (e.g., such as a computer) every time he/she desires to print a document. The user may simply walk to the printer 20, access the desired documents directly from the printer 20, access the print attributes directly from the printer 20, and apply the print attributes to the documents directly from the printer 20. Once the print attributes have been selected and applied to the documents, the user may print such modified/altered documents (i.e., including the print attributes selected) and store such modified document either to that multi-function printer or may send such modified document to a plurality of host devices or electronic devices.

Moreover, the user may view a snapshot of how the document looks with the print attributes selected before printing the document. This may be referred to as a mimic page. In other words, the user interface 25 may include a display screen for displaying a snapshot of how the document looks before pressing the select button on the printer 20. Thus, one or more interfaces or dialogue boxes on the user interface 25 located on the printer 20 may include a page mimic where the user interface 25 displays a page mimic corresponding to a real-time representation of the one or more electronic documents having the one or more print attributes applied thereto.

Thus, in summary, embodiments of the present disclosure may include displaying on the user interface 25 a page mimic, which displays a representation of the page to be printed and an image representation of an image on the page representation. The page mimic may display the image representation having a size corresponding to the user-selected scaling percentage, be displayed on the page representation in the position selected by the user, and/or be displayed with a portrait or landscape format as selected by the user. These features may allow a user to select paper capabilities such as paper size, scaling, orientation, image position and so forth in an easy to use and intuitive manner, and to see the results in the page mimic before printing the page. When the user changes the paper capabilities, the page mimic may be automatically updated to reflect the changes.

Figure 2:
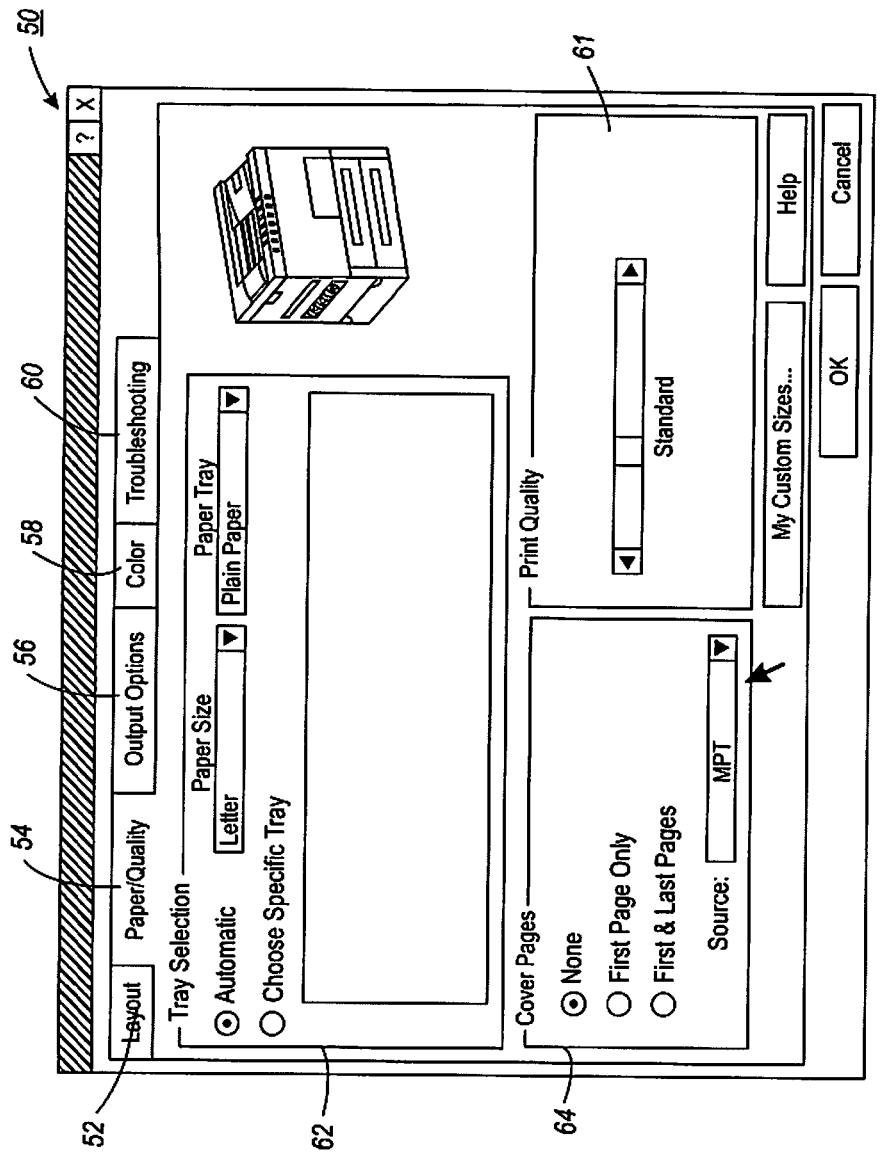
FIG. 2 illustrates one exemplary screen displayed on a user interface of the multi-function printer, the screen including one or more print attributes to be applied to one or more documents, in accordance with the present disclosure.

Referring to FIG. 2, one exemplary screen displayed on a user interface of the multi-function printer, the screen including one or more print attributes to be applied to one or more documents, in accordance with the present disclosure is presented.

The user interface 25 (see FIG. 1) may display the printer drive interface 50. The printer drive interface 50 may include a layout option 52, a paper/quality option 54, an output option 56, a color option 58, and a troubleshooting option 60. Additionally, a tray selection option 62, a cover page option 64, and a print quality option 66 may be presented. Of course, the printer driver interface 50 is only an exemplary interface or dialogue window that may be accessed by a user of the printer 20. A plurality of different windows/dialogue boxes having a plurality of different options may be presented to a user. One skilled in the art may contemplate a plurality of different configurations and layouts for enabling a user to communicate with the printer 20.

For example, embodiments of the present disclosure may include displaying on the user interface 25, a scaling percentage selectable by the user. The scaling percentage may allow the user to input any desired percentage for scaling of the image. Embodiments of the present disclosure may also include displaying on the user interface 25, orientation and positioning options allowing a user to select desired orientation and positioning to be applied to the printed image.

Figure 3:
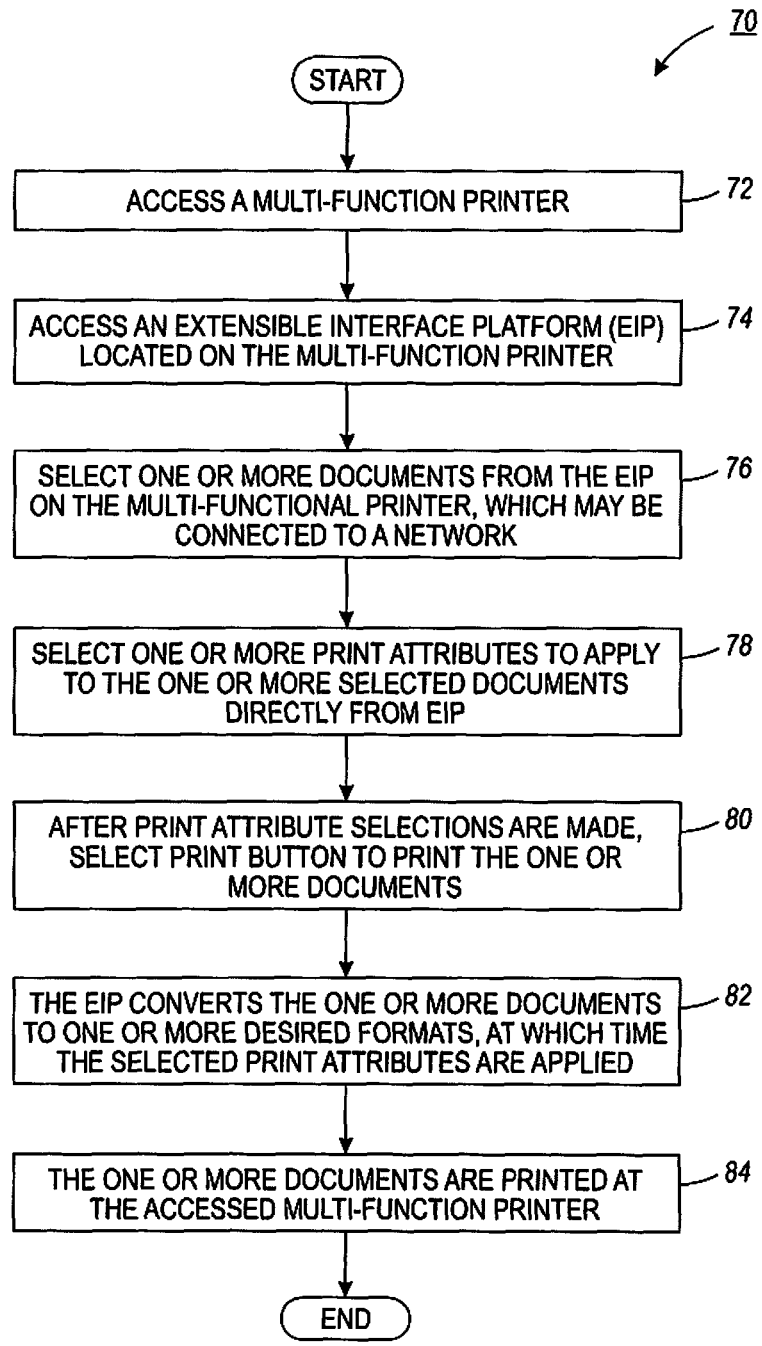
FIG. 3 illustrates a flowchart outlining one method for printing one or more documents having one or more print attributes directly from the multi-function printer, in accordance with the present disclosure.

Referring to FIG. 3, a flowchart outlining one method for printing one or more documents having one or more print attributes directly from the multi-function printer, in accordance with the present disclosure is presented.

The flowchart 70 includes the following steps. In step 72, a user may access a multi-function printer. In step 74, a user may then access an extensible interface platform (EIP) application using the UI located on or about the multi-function printer. In step 76, the user is permitted to select one or more documents from the EIP screen which is displayed at the UI located on or about the multi-function printer, which may also be connected to a network. In step 78, the user is permitted to select one or more print attributes to apply to the one or more selected documents directly from the EIP application screen. In step 80, after the print attribute selections are made, the user may select the print button to print the one or more documents. In step 82, the EIP application may convert the one or more documents to one or more desired formats, at which time the selected print attributes are applied. In step 84, the one or more documents are printed at the accessed multi-function printer. The process then ends.

Advantages of the present disclosure include at least the following: (i) that the job print attributes are bound 'late,' i.e., at the point of print need (when users walk up to the multi-function printer), (ii) the user may access the document directly from the repository without having to go back to their personal computer, and (iii) the user may print the document again, from any multi-function printer/device, and apply different print attributes.

Embodiments as disclosed herein may also include computer-readable media for carrying or having computer-executable instructions or data structures stored thereon. Such computer-readable media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which may be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A multi-function printer comprising: a processor; and a computer-readable storage medium in communication with the processor, wherein the computer-readable storage medium comprises one or more programming instructions for: receiving a plurality of electronic documents in an original creative format other than a printer ready format from one or more electronic devices; storing the plurality of electronic documents in a storage unit located within the multi-function printer; permitting access to one or more of the plurality of electronic documents via a user interface positioned about the multi-function printer; permitting selection of one or more print attributes via the user interface; applying the one or more print attributes selected to the one or more electronic documents accessed; and outputting the one or more electronic documents accessed having the one or more print attributes applied thereto.

2. The multi-function printer according to claim 1, wherein the user interface is an extensible interface platform (EIP).

3. The multi-function printer according to claim 1, wherein the user interface displays a plurality of options related to the one or more print attributes.

4. The multi-function printer according to claim 3, wherein the one or more options include one or more of the following: plex, color, quantity, stapling, paper size, margins, and watermark.

5. The multi-function printer according to claim 1, wherein the one or more electronic documents having the one or more print attributes applied thereto are stored in the storage unit of the multi-function printer.

6. The multi-function printer according to claim 1, wherein the one or more electronic documents having the one or more attributes applied thereto are stored in a plurality of multi-function devices connected to a network, each of the plurality of multi-function devices having an extensible interface platform for permitting further editing of the one or more electronic documents having the one or more attributes applied thereto.

7. The multi-function printer according to claim 1, wherein the one or more electronic documents having the one or more attributes applied thereto are transmitted back to the one or more electronic devices.

8. The multi-function printer according to claim 1, wherein the user interface displays a page mimic corresponding to a real-time representation of the one or more electronic documents having the one or more print attributes applied thereto.

9. The multi-function printer according to claim 1, wherein the multi-function printer is in electronic communication with at least one network.

10. A method for using a multi-function printer having a print driver, the method comprising: receiving a plurality of electronic documents from one or more electronic devices, the electronic documents being in an original creative format other than a printer ready format; storing the plurality of electronic documents in an original creative format in a storage unit located within the multi-function printer; permitting access to one or more of the plurality of electronic documents via a user interface positioned about the multi-function printer; permitting selection of one or more print attributes via the user interface; applying the one or more print attributes selected to the one or more electronic documents accessed; and outputting the one or more electronic documents accessed having the one or more print attributes applied thereto.

11. The method according to claim 10, wherein the user interface is an extensible interface platform (EIP).

12. The method according to claim 10, wherein the user interface displays a plurality of options related to the one or more print attributes.

13. The method according to claim 12, wherein the one or more options include one or more of the following: plex, color, quantity, stapling, paper size, margins, and watermark.

14. The method according to claim 10, wherein the one or more electronic documents having the one or more print attributes applied thereto are stored in the storage unit of the multi-function printer.

15. The method according to claim 10, wherein the one or more electronic documents having the one or more attributes applied thereto are stored in a plurality of multi-function devices connected to a network, each of the plurality of multi-function devices having an extensible interface platform for permitting further editing of the one or more electronic documents having the one or more attributes applied thereto.

16. The method according to claim 10, wherein the one or more electronic documents having the one or more attributes applied thereto are transmitted back to the one or more electronic devices.

17. The method according to claim 10, wherein the user interface displays a page mimic corresponding to a real-time representation of the one or more electronic documents having the one or more print attributes applied thereto.

18. The method according to claim 10, wherein the multi-function printer is in electronic communication with at least one network.

19. A multi-function printer comprising: one or more input modules for receiving information from one or more host devices, the information comprising at least one electronic document in an original creative format; a memory for storing the information received from the one or more host devices; a processor for executing a plurality of instructions related to the information received from the one or more host devices; a user interface for accessing the information and for altering the information based on a plurality of print attributes; and an outputting module for printing the information altered based on the plurality of print attributes.

20. The multi-function printer according to claim 19, wherein the user interface is an extensible interface platform (EIP).

* * * * *